United States Patent Office.

NATHANIEL JENKINS, OF NEW ORLEANS, LOUISIANA.

Letters Patent No. 110,470, dated December 27, 1870.

IMPROVEMENT IN MEDICAL COMPOUNDS FOR CURE OF RHEUMATISM.

The Schedule referred to in these Letters Patent and making part of the same.

To all whom it may concern:

Be it known that I, NATHANIEL JENKINS, of New Orleans, in the parish of Orleans and State of Louisiana, have invented a new and useful Improvement in Medical Compound; and I do hereby declare that the following is a full, clear, and exact description thereof, which will enable others skilled in the art to make and use the same.

The object of this invention is to provide a simple, safe, and effectual remedy for rheumatism, gout, neuralgia, and kindred diseases; and It consists in combining the ingredients hereinafter specified in the proportions and in the manner hereinafter described.

In carrying out my invention and discovery I proceed as follows, viz:

I take of wild cherry bark, one and one-fourth pound;
Sweet anise seed, one and one-fourth pound;
Acetic ether, one-half ounce;
Sweet spirits of niter, one and one-half ounce;
Caramel, one ounce;
Alcohol of 52° Baumé, 1 gallon.

Pour the alcohol on the above ingredients and macerate for the space of about four days. The composition is then filtered, when it is ready for bottling and use.

This compound may be administered externally as well as internally, and is a most effectual remedy for rheumatism, neuralgia, gout, and all diseases of a similar nature.

Having thus described my invention,

I claim as new and desire to secure by Letters Patent—

The above medical compound, substantially as and for the purposes described.

NATHANIEL JENKINS.

Wisnesses:
A. HERO, Jr.
STEPHEN GAY.